(12) United States Patent
Hata et al.

(10) Patent No.: US 7,355,563 B2
(45) Date of Patent: Apr. 8, 2008

(54) DISPLAY APPARATUS AND DISPLAY DEVICE

(75) Inventors: Takuya Hata, Saitama (JP); Takashi Chuman, Saitama (JP); Yoshihiko Uchida, Saitama (JP); Hideo Satoh, Saitama (JP); Atsushi Yoshizawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 685 days.

(21) Appl. No.: 10/761,203

(22) Filed: Jan. 22, 2004

(65) Prior Publication Data

US 2004/0169619 A1 Sep. 2, 2004

(30) Foreign Application Priority Data

Jan. 24, 2003 (JP) .............................. 2003-016673

(51) Int. Cl.
*G09G 5/00* (2006.01)
(52) U.S. Cl. ............................................. 345/6; 348/52
(58) Field of Classification Search ................ 345/4–6, 345/9, 1.1; 348/52
See application file for complete search history.

(56) References Cited

U.S. PATENT DOCUMENTS 3,555,349 A * 1/1971 Munz .......................... 315/383

5,912,649 A 6/1999 Hattori et al.
5,929,572 A 7/1999 Whitesell

FOREIGN PATENT DOCUMENTS

| EP | 1 098 376 | 5/2001 |
| JP | 7-169570 | 7/1995 |
| JP | 2000-115812 | 4/2000 |

* cited by examiner

*Primary Examiner*—Amr A. Awad
*Assistant Examiner*—Steven E Holton
(74) *Attorney, Agent, or Firm*—Young & Thompson (57) ABSTRACT

A display apparatus (1) for generating a stereoscopic image by superimposing a plurality of images at a predetermined interval from each other on the view line of the viewer, the apparatus comprising: a first display unit (11) having a plurality of emission areas (11-1) for emitting a light, disposed in a discrete manner in a plane of a display screen and a plurality of transmission areas (11-2) for transmitting a light, disposed in a discrete manner in the plane of the display screen except for areas occupied by said plurality of emission areas; and a second display unit (12) disposed behind the first display unit as seen from the viewer.

10 Claims, 8 Drawing Sheets

DISPLAY APPARATUS AND DISPLAY DEVICE

BACKGROUND OF THE INVENTION

1. Field of the Invention

The present invention relates to a display apparatus suitably used for displaying a stereoscopic image by disposing a plurality of display devices at a predetermined interval on a view line of a viewer and superimposing images generated by these display devices, and further relates to a display device used as a unit for constructing the display apparatus.

2. Description of the Related Art

Heretofore, various types of display apparatuses allowing a stereoscopic display are presented or put into practical use. For example, a Liquid Crystal Shutter (hereinafter referred to as "LCS") glasses system or the like is well known as an electrically rewritable display apparatus allowing a stereoscopic display. In this LCS glasses system, an object is shot from different directions with one or more cameras, and the obtained image data, including the parallax information, are synthesized to a picture signal, that is supplied to the display apparatus where it is displayed. While the viewer wears the LCS glasses, typically an LCS for right eye is in a light transmissive state, and an LCS for left eye is in a light blockage state during an odd field. On the other hand, the LCS for left eye is in the light transmissive state, the LCS for right eye is in the light blockage state during an even field. For this, an image for right eye is displayed in the odd field, while an image for left eye is displayed in the even field, and thereby these images for right or left eye including each parallax are viewed through the right or left eye respectively, resulting in a stereoscopic image.

On the other hand, there is a display apparatus allowing a stereoscopic display, by disposing a plurality of display members with a predetermined distance from each other on the view line of the viewer, and superimposing images generated by each display member, although this stereoscopic image is rather discrete in a depth direction. Furthermore, there is an improvement of the display apparatus, in which the luminance or brightness of image displayed on each display members is modulated, in order to improve the discrete image, and thereby the viewer feels an improved stereoscopic illusion as if the object is between two discrete images. For example, there is an intensity modulation type (i.e., a brightness modulation type or a luminescence modulation type) of display apparatus allowing that a semi-transparent object or an object in backward become transparent by superimposing the object images generated by said a plurality of display members using a plurality of half mirrors (e.g. Japanese Patent Application Laid-Open No. 2000-115812).

Nevertheless, in the display apparatus having a plurality of display members disposed with a predetermined distance from each other on the view line of the viewer, there is a technical problem that an image to be displayed on one display member is apt to be reflected on other display member(s), and thereby the viewer fails to view an appropriate image. For example, a light emitted from one display member having a light transmissive property propagates not only in a direction to the viewer but also in a direction opposite to the viewer, due to the light transmissive property of the display member. In this case, the light emitted from one display member is reflected on other display member(s) disposed toward behind the former display member as seen from the viewer, and thereby the viewer views the wrong image different from the image to be viewed. That is, since it is difficult or impossible to display a stereoscopic image in an appropriate state, there is a technical problem of difficulty in displaying a stereoscopic image, in spite of employing any type of the intensity modulation display apparatus.

Additionally, the light is wastefully consumed for this reflection of the light, and thereby there is a technical problem of low efficiency in utilizing the light for the display.

SUMMARY OF THE INVENTION

The present invention has been accomplished in view of the above technical problems for example. It is therefore an object of the present invention to provide a display apparatus allowing the viewer to view an image displayed on one of a plurality of display members in an appropriate condition, and thereby allowing the viewer to view a appropriate stereoscopic image, and further to provide a display device used as a unit for constructing the display apparatus.

The above object of the present invention is achieved by a display apparatus according to Claim 1 for displaying a stereoscopic image by superimposing a plurality of images on a view line of a viewer, said plurality of images spaced from each other by a predetermined distance, the display apparatus being provided with: (i) a first display unit including a display device having a plurality of first emission areas for emitting a light, disposed in a discrete manner in a plane of a display screen and a plurality of transmission areas for transmitting a light, disposed in a discrete manner in the plane of the display screen except for areas occupied by said plurality of first emission areas; and (ii) a second display unit disposed behind the first display unit as seen from the viewer.

The above object of the present invention is achieved by a display device according to Claim 7, the display device being provided with: a plurality of emission areas for emitting a light, disposed in a discrete manner in a plane of a display screen; and a plurality of transmission areas for transmitting a light, disposed in a discrete manner in the plane of the display screen except for areas occupied by said plurality of emission areas.

The effect and advantages of the present invention will be apparent from the following embodiments of the present invention.

Embodiment of the Present Invention

The embodiment of the preset invention will now be discussed.

In an aspect of the display apparatus according to the present invention, the display apparatus is for displaying a stereoscopic image by superimposing a plurality of images on a view line of a viewer, said plurality of images spaced from each other by a predetermined distance. The display apparatus is provided with: (i) a first display unit including a display device having a plurality of first emission areas for emitting a light, disposed in a discrete manner in a plane of a display screen and a plurality of transmission areas for transmitting a light, disposed in a discrete manner in the plane of the display screen except for areas occupied by said plurality of first emission areas; and (ii) a second display unit disposed behind the first display unit as seen from the viewer.

According to this aspect of the display apparatus according to the preset invention, during the operation, images for a stereoscopic display are displayed respectively on the first display unit having the first emission areas and the transmission areas as mentioned above, and on the second display unit disposed behind the first display unit (i.e. backward as seen from the viewer). The image displayed on the second display unit can be viewed by the viewer through the first display unit having said plurality of transmission areas. Therefore, the display apparatus according to the present invention can superimpose the images displayed respectively on the first and second display units on the view line of the viewer. Thereby, a stereoscopic display or three-dimensional (hereinafter referred to as "3D") display can be achieved. That is, the viewer can view the stereoscopic image.

For example, if a stereoscopic display is performed in an intensity modulation system, the luminance or brightness of the object to be displayed respectively on both of two display units (i.e. the first display unit and the second display unit) is controlled so that a continual stereoscopic image is displayed as if the object exists in a length between these two display units. Alternatively, the object may be displayed on either of these two display units so that a discrete stereoscopic image is obtained. Furthermore, the object may be displayed on either one of three or more display units so that a discrete or continual stereoscopic display is obtained.

Particularly in the display apparatus of this aspect, a light emitted from the first emission areas of the first display apparatus does not propagates in a direction to the second display unit (i.e. a direction opposite to the viewer) but a direction to the viewer, owing to a reflection layer mentioned below for example. Thereby, a generation of a reflection light on the display screen of the second display unit, which may be generated in the case that a light that propagates in a direction to the second display unit is emitted (i.e. in the case that the first display unit is a display device having a light transmissive property but having none of the first emission areas nor the transmission areas), can be avoided. Therefore, it is very advantageous to avoid an adverse viewing in which the image (object) to be displayed on the first display unit is reflected on the second display unit. This advantage is very important in a stereoscopic display system for displaying a stereoscopic image by superimposing a plurality of images on the view line of the viewer.

Consequently, according to the display apparatus of this aspect, it is prevented that a light emitted from the first display unit is reflected on the display screen of the second display unit. Therefore, an appropriate viewing of the viewer can be achieved, without affecting images to be displayed respectively on the first and second display units for a stereoscopic display purpose. Thereby, the viewer can feel a stereoscopic image by viewing images for a stereoscopic display purpose, which are suitably superimposed on the view line of the viewer.

Incidentally, in this aspect, any stereoscopic display system or 3D display system may be employed instead of the intensity modulation system in order to obtain the same effect as mentioned above.

On the other hand, an electroluminescence (also referred to as "EL") display device is preferably employed as the second display unit. Alternatively, a CRT (cathode-ray tube) display device, a PDP (Plasma Display Panel) device, a FED (Field Emission Display) device, an LCD (Liquid Crystal Display) device or the like may be employed as the second display unit in order to obtain the same effect as in the case of the display device of this aspect, since a light transmissive property is not necessary for the second display unit.

Incidentally, a further display unit having emission areas and transmission areas may be employed frontward of the first display unit (i.e. the front side or near side as seen from the viewer), in other words three or more display units may be employed, in order to obtain the same effect as in the case of the display apparatus of this aspect.

In an aspect of the display apparatus according to the present invention, the second display device includes another display device having a plurality of second emission areas for emitting a light, disposed in a discrete manner at least partially in a plane of a display screen.

According to this aspect, an appropriate image can be displayed, owing to the second display unit having said plurality of second emission areas, by emitting a light from a preferable part of said plurality of second emission areas.

Additionally, as mentioned below, aligning the second emission areas with the transmission areas allows the viewer to appropriately view the light emitted from the second display unit.

In another aspect of the display apparatus according to the present invention, each of said plurality of second emission areas is disposed for each pixel or for a plurality of pixels in the plane.

According to this aspect, disposing one of said plurality of second emission areas for each pixel allows an image to be appropriately displayed on the second display unit without changing the resolution of the display screen.

Alternatively, disposing one of said plurality of second emission areas for a plurality of pixels advantageously brings the simplification in the construction of the second display unit, even though the resolution of the display screen is slightly lowered.

In any aspect, the desirable image can be displayed as appropriate.

In an aspect of the display apparatus including the second display unit having the second emission areas as mentioned above, each of said plurality of second emission areas may be arranged in a plane so as to align with each of said plurality of transmission areas in another plane.

In this arrangement, a light emitted from the second emission areas can appropriately propagate toward the transmission areas of the first display unit. That is, the light that propagates toward the first display unit (especially, toward the first emission areas) is not viewed by the viewer, and thereby the light can be selected and emitted appropriately to be viewed by the viewer. Thereby, a practical great advantage of reduction in the power consumption for a light emission in the second emission areas can be obtained.

On the other hand, if a light that propagates toward the first emission areas of the first display unit exists, such a light may be reflected at the reflection layer for example of the first emission areas. The light reflected as such may be viewed by the viewer as a noise light.

In this arrangement, however, the second emission areas of the second display unit selectively emits a light that propagates toward the transmission areas of the first display unit and thereby can avoid or reduce the generation of the noise light. Therefore, the viewer can view images for a stereoscopic purpose, which are displayed respectively on the first and second display units and appropriately superimposed on the view line.

Nevertheless, the generation of the noise light does not affect the system to a level at which images for a stereoscopic display purpose cannot or hardly be viewed. At that level, it is possible to view a stereoscopic image by superimposing images for the stereoscopic display purpose, although the avoidance of the noise light enhances the resolution of the stereoscopic image to be viewed.

In an aspect of the display apparatus including the second display unit having the second emission areas as mentioned above, each of said plurality of second emission areas may be of a size the same as that of each of said plurality of transmission areas.

In this arrangement, the light emitted from the second emission areas can appropriately transmit through the transmission areas. That is, the light is further prevented from being reflected at the first emission areas or the like, and thereby can be appropriately viewed by the viewer without a "light damping" due to the reflection. Therefore, in addition to a fact that the generation of the noise light is prevented, it is possible for the viewer to view the light emitted from the second display unit.

Thereby, the viewer can suitably view not only the image displayed on the second display unit but also the stereoscopic image that is obtained by superimposing the image displayed on the second display unit onto another image displayed on the first display unit.

In another aspect of the display apparatus according to the present invention, the second display device is an electroluminescence display device.

According to this aspect, the display apparatus allowing a stereoscopic display can be constructed by means of the electroluminescence device.

Furthermore, similarly to the aspect of the display device according to the present invention, it is possible to form the second emission areas capable of emitting a light that propagates through the transmission areas of the first display unit, by making a part of the electroluminescence layer of the second display unit emit a light. Alternatively, the electroluminescence layer of the second display unit may be disposed so as to align with the transmission areas of the first display unit. In this case, each of the second emission areas is the electroluminescence layer.

Incidentally, any type of electroluminescence display device may be employed including a bottom emission type, a top emission type and so on. Otherwise, it may be a passive matrix drive system or may be an active matrix drive system.

In an aspect of the display device according to the present invention, the display device is provided with: a plurality of emission areas for emitting a light, disposed in a discrete manner in a plane of a display screen; and a plurality of transmission areas for transmitting a light, disposed in a discrete manner in the plane of the display screen except for areas occupied by said plurality of emission areas.

According to the aspect of the display device of the present invention, said plurality of emission areas disposed in a discrete manner in a plane of the display screen are arranged so that each of the areas individually emits a light. Once a signal which controls an emission is inputted into each of said plurality of emission areas by a microcomputer or the like, at a desired timing, a desired part of said plurality of emission areas emits a light. The light emitted from the desired part of said plurality of emission areas collectively allows an image to be appropriately displayed on the display screen. Therefore, the viewer can view the image displayed on the display device according to this aspect.

Furthermore, in the case that the light enters each of said plurality of transmission areas disposed in a discrete manner in a plane of the display screen, the incident light propagates through the display device according to this aspect. Therefore, for example, the light that propagates from rear side (as seen from the viewer) of the display device of this aspect can propagate through the display device of this aspect. That is, the viewer can view the rearward of the display device through the display device of this aspect. Therefore, the viewer can view, for example, an object or scenery that exists behind the display device of this aspect. Alternatively, if a predetermined display device is disposed behind the display device of this aspect, the viewer can view the image or picture displayed on the predetermined display device (i.e. the rearward device).

Consequently, the disposition of said plurality of emission areas and said plurality of transmission areas allows the desired image to be displayed, and allows the display device having a light transmissive property to be presented. Thereby, the viewer can view not only the image displayed on the display screen of the display device of this aspect but also scenery, object, picture or image that exists behind the display device.

Therefore, as mentioned above, the alignment of the display device according to this aspect with the predetermined display device on the view line of the viewer contributes to present the display apparatus for a stereoscopic display.

Incidentally, even if the emission areas do not have a light transmissive property, the existence of the transmission part gives a light transmissive property to the display device. Therefore, in this case, the light emitted from said plurality of emission areas propagates toward the display screen with the aid of the reflection layer mentioned below.

Incidentally, each of said plurality of emission areas and each of said plurality of transmission areas may be disposed in a predetermined relationship to each other. That is, one of the emission areas and one of the transmission areas is defined as a unit, and a plurality of this unit may be disposed in a discrete manner in a plane of the display screen.

Alternatively, each of said plurality of emission areas and each of said plurality of transmission areas may be disposed in a lattice-like manner in the plane.

In an aspect of the display device according to the present invention, each of said plurality of emission areas is disposed for each pixel or for a plurality of pixels in the plane.

According to this aspect, the disposition of one emission area for each one pixel provides the same effect as in the case of the aspect of the display device according to the present invention, without changing the resolution of the display screen. That is, this has a great advantage of maintaining the quality of the image (i.e. the image quality) displayed on the display screen.

Alternatively, the disposition of one emission area for a plurality of pixels gives a great advantage of simplicity in the construction of the display device, even though there is a slight reduction in the resolution of the display screen.

In any aspect, a desired image can be displayed as appropriate, while the display device having a light transmissive property can be presented.

Incidentally, similarly to the emission areas, one of the transmission areas may be disposed for each pixel, or may be disposed for a plurality of pixels. Alternatively, any arrangement other than the above arrangements can give the same effect as in the case of the aspect of the display device according to the present invention.

In another aspect of the display device according to the present invention, at least one of said plurality of emission areas and at least one of said plurality of transmission areas are disposed in a same pixel in the plane.

According to this aspect, the disposition of one of the emission areas for each pixel allows the image to be displayed on the display screen, without changing the resolution of the display screen. Furthermore, the disposition of one of the transmission areas for each pixel gives a light transmissive property to the display screen as a whole.

Therefore, it is possible to view the scenery, object, picture, image or the like that exists behind the display screen throughout its entire surface.

Thereby, it is possible to appropriately display an image on the display screen throughout its entire surface and to present the display device whose display screen has a light transmissive property as a whole.

Incidentally, one emission area and one transmission area may be the same in their size, or may be different in their size.

In another aspect of the display device according to the present invention, each of said plurality of emission areas has an electroluminescence emission layer and a reflection layer disposed behind the electroluminescence emission layer as seen from the said display screen, and said plurality of transmission areas has light transmissive areas that are positioned in interstitial areas where said reflection layer is not formed.

According to this aspect, the electroluminescence emission layer having a self-emission property emits a light in both directions i.e. in a direction to the display screen and in a direction opposite to the display screen (i.e. the rear side of the electroluminescence emission layer as seen from the display screen). In this case, the light that is emitted in the direction opposite to the display screen is reflected at the reflection layer and propagates toward the display screen. Thereby, the light emitted from the electroluminescence advantageously propagates toward the display screen, resulting in an appropriate image, which is displayed on the display screen.

Furthermore, the light transmissive area without the reflection layer (i.e. interstitial areas where said reflection layer is not formed) has a light transmissive property. Therefore, these areas forms said plurality of transmission areas.

Consequently, the display device including the emission areas and the transmission areas can be presented by using a so-called electroluminescence display device. Incidentally, an emission direction type of the electroluminescence display device may be a bottom emission type or may be a top emission type.

Incidentally, the reflection layer may be formed including aluminum. Alternatively, any material other than aluminum may be employed to form the reflection layer, insofar as the material has high reflectivity.

Furthermore, the reflection layer may be one of a pair of electrodes (e.g. a metal electrode layer as mentioned below) for applying an electric voltage to the electroluminescence emission layer as mentioned below, or may be a reflector disposed for the light reflection as mentioned below.

In an aspect of the display device having the reflection layer mentioned above, the reflection layer may be a metal electrode layer acting as one of a pair of electrodes for applying a drive voltage to the electroluminescence emission layer from its behind.

In this arrangement, the electrode used for the electroluminescence display device may be used also as the reflection layer. Therefore, the reflection layer may be used for reflecting the light and may be further used as the electrode for applying electric voltage to the electroluminescence emission layer.

In an aspect of the display device whose reflection layer is a metal electrode acting as one of a pair of electrodes, the other of said pair of electrodes may be a transparent electrode layer disposed toward the front side of said electroluminescence emission layer as seen from the display screen.

In this arrangement, a light emitted from the electroluminescence emission layer disposed between the metal electrode and the transparent electrode, as well as the reflection light thereof reflected at the metal electrode, can propagate toward the display screen through the transparent electrode (i.e. front side of the electroluminescence emission layer as seen from the display screen). Therefore, the light emitted from the electroluminescence emission layer allows an image to be appropriately displayed on the display screen and thereby allows the viewer to view the image appropriately.

Incidentally, the electroluminescence emission layer may exist or may not exist at a light transmissive area at which the metal electrode does not exist. If the electroluminescence emission layer exist at that area, that area does not act as the emission area because the electroluminescence emission layer does not emit a light without the existence of the metal electrode in the light transmissive area.

As mentioned above, according to aspects of the display apparatus of the present invention, the first and second display units are provided. Thereby, it allows the appropriate viewing of the viewer, without changing images for a stereoscopic display purpose. On the other hand, according to aspects of the display device of the preset invention, said plurality of emission areas and said plurality of transmission areas are provided. Thereby, it allows the appropriate display of the desired image as well as the configuration having a light transmissive property. Furthermore, according to the embodiment of the display apparatus of the present invention, regardless of motion or still picture, the same effect, i.e. a viewing of stereoscopic image can be obtained.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Embodiments

Embodiments of the present invention and the display apparatus will now be discussed, with reference to drawings.

Embodiments of Display Apparatus

Embodiments of the display apparatus according to the present invention will now be discussed, with reference to FIG. 1 to FIG. 4.

(1) Fundamental Construction of Display Apparatus

Figure 1:
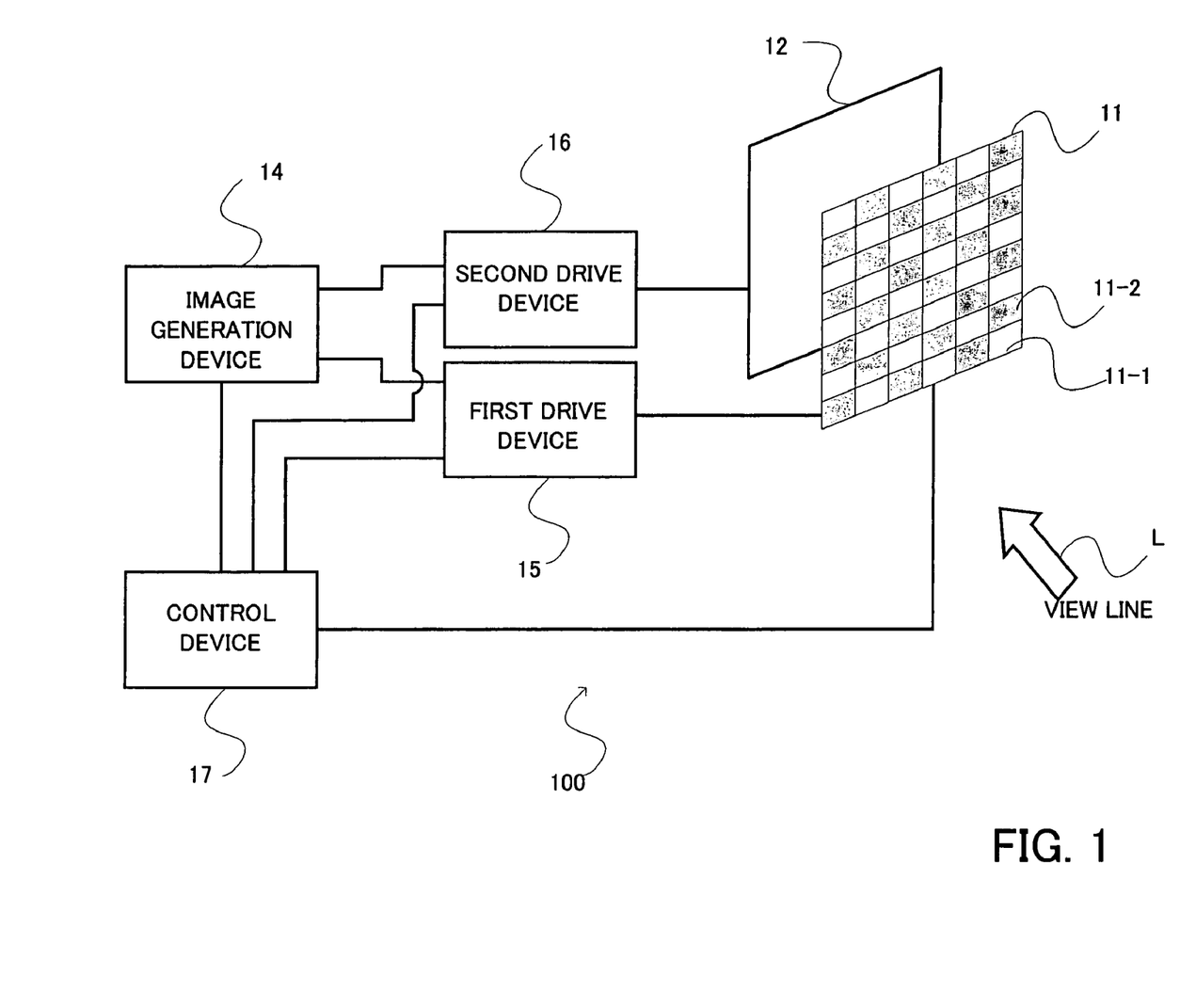
FIG. 1 is a block diagram illustrating an embodiment of a display apparatus according to the present invention.

With reference to FIG. 1, a fundamental construction of a display apparatus in an embodiment of the present invention will now be discussed. FIG. 1 is a block diagram illustrating a construction of the embodiment of the display apparatus according to the present invention.

As shown in FIG. 1, the display apparatus 100 is provided with a front screen 11, a rear screen 12 disposed to rearward of the front screen 11, an image generation device 14 for generating images to be displayed on the front screen 11 and on the rear screen 12, a first drive device 15 for displaying an image signal from the image generation device 14 on the front screen 11, a second drive device 16 for displaying an image signal from the image generation device 14 on the rear screen 12 and a control device 17 for controlling entirely the display apparatus 100.

Both the front screen 11 and the rear screen 12 form together an image display area of the display apparatus 100, and disposed with a predetermined interval therebetween in a direction along a line from a viewer L (hereinafter this line is referred to as a "view line"). The front screen 11 is disposed in frontward, and the rear screen 12 is disposed in rearward. The front screen 11, which may be the aforementioned organic EL display device, is required to have a light transmissive property, so that the viewer can view the image on the rear screen 12 through the front screen 11. On the other hand, the rear screen 12, which is disposed in rearward, may be the organic EL display device or may be CRT display device, PDP device, FED device or LCD device, because a light transmissive property is not necessary for the rear screen 12.

Particularly in the present invention, the front screen 11 is formed as a display device according to the present invention, as mentioned below, including a plurality of emission areas 11-1 for emitting a light and a plurality of transparent areas 11-2 for transmit a light from the rear screen 12. The front screen 11 generates an image for a 3D display purpose by means of the light emitted from the emission area 11-1. On the other hand, the transmission areas 11-2 transmit the light emitted from the rear screen 12 to give an image displayed on the rear screen 12 for the 3D display purpose to the viewer. Thereby, the viewer can recognize a stereoscopic image even if it is rather in a discrete manner. Furthermore, it is possible to display a more real image as if the image were between the front screen 11 and the rear screen 12, by controlling the brightness of the image. That is, a stereoscopic display in intensity modulation system is also possible.

Incidentally, one of the emission areas 11-1 and one of the transmission areas 11-2 may be provided for each pixel. Alternatively, one of the emission areas 11-1 and one of the transmission areas 11-2 may be provided for a plurality of pixels. In any case, the emission areas 11-1 and the transmission areas 11-2 are preferably disposed next to each other, that is, in a lattice-like manner as shown in FIG. 1. Nevertheless, this lattice-like manner is not restrictive.

Incidentally, the rear screen 12 may be capable of emitting a light from its surface in the entirety. Alternatively, like as the emission areas 11-1 of the front screen 11, emission areas 12-1 (See FIG. 4) capable of emitting a light may be provided for a part of the rear screen 12. In any case, a light emitted from the emission areas 12-1 of the rear screen 12 can pass through the transmission areas 11-2 of the front screen 11 to display an appropriate image on the rear screen 12.

The image generation device 14 is for generating images to be displayed on each of the front screen 11 and the second screen 12, and for recording these images. Alternatively, an externally inputted image such as an image generated in a personal computer or the like may be recorded in a predetermined record area and may be read if necessary. The image as a unit can be individually managed to be processed for an individual display. Position, size, brightness, color tone and display mode, or image deformation or the like can be individually controlled, in addition to whether the image is to be displayed on the front screen 11 or the rear screen 12.

The first drive device 15 and the second drive device 16 are for driving the front screen 11 and the rear screen 12 for a display purpose, respectively, on the basis of image signals generated in the image generation device 14 for the front screen 11 or the rear screen 12. Under control of the control device 17, there may be provided a function for a decorative and effective drive, taking into account the display timing, blinking or the like.

The control device 17 controls the display apparatus 100 in its entirety. The control device 17 defines a display mode on the front screen 11 and the rear screen 12, such as the brightness, size, or the like for a stereoscopic image display, and makes the image generation device 14 generate image signals to be displayed on each screens. Furthermore, the control device 17 controls the first drive device 15 and the second drive device 16 in their operations.

(2) Principles of Display Apparatus

Figure 2:
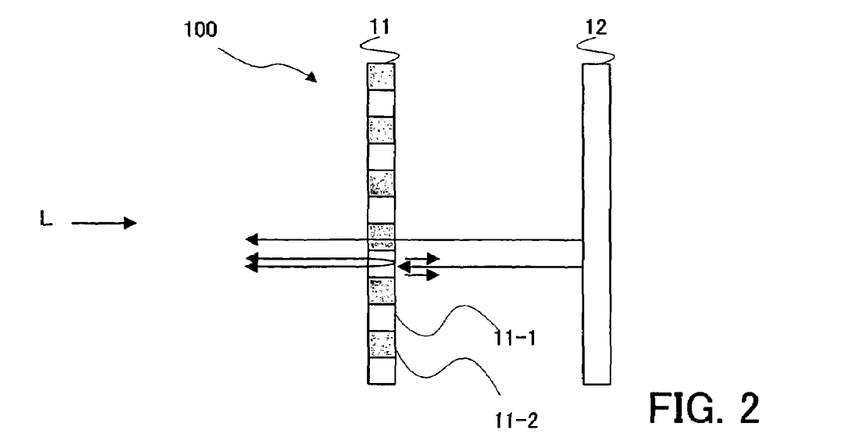
FIG. 2 is a schematic view conceptually illustrating a construction of the embodiment of the display apparatus according to the present invention.
Figure 3:
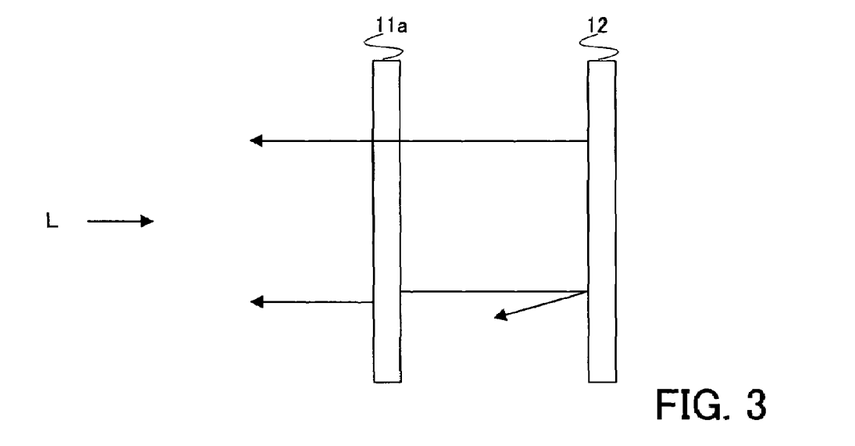
FIG. 3 is a schematic view conceptually illustrating a construction of a conventional display apparatus as a comparative embodiment of the present invention.
Figure 4:
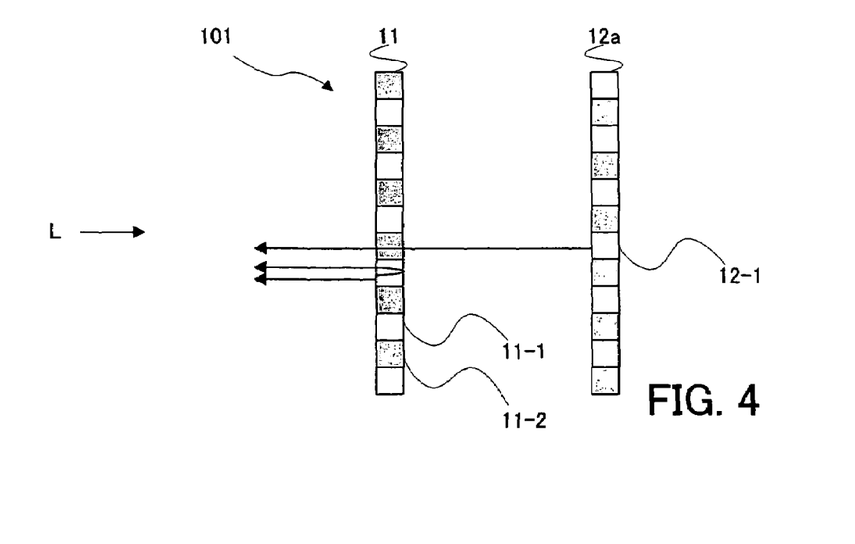
FIG. 4 is schematic view conceptually illustrating another construction of the embodiment of the display apparatus according to the present invention.

Next, with reference to FIG. 2 to FIG. 4, the operation principle of the display apparatus according to an embodiment of the present invention will now be discussed. FIG. 2 is a cross-sectional view schematically illustrating a light emission in the display apparatus according to the embodiment of the present invention. FIG. 3 is a cross-sectional view schematically illustrating a comparative embodiment of the embodiment of the present invention. FIG. 4 is a cross-sectional view schematically illustrating another embodiment of the light emission in the display apparatus of the present invention.

As shown in FIG. 2, the front screen 11 has a plurality of emission areas 11-1 and a plurality of transmission areas 11-2. In this case, one pixel of the front screen 11 is preferably made of one emission area 11-1 and one transmission area 11-2. Alternatively, as mentioned below, one pixel may be made of one emission area 11-1 or one transmission area 11-2.

A light emitted from the emission area 11-1 of the front screen 11 having a light transmissive property propagates in a direction to the viewer and in a direction opposite to the viewer. That is, fifty percent of the light emitted from the emission area 11-1 propagates in a direction to the viewer, while the remaining fifty percent propagates in a direction opposite to the viewer. However, the light that propagates in a direction opposite to the viewer is reflected by a metal electrode 114 (FIG. 5) or a reflector 119 (FIG. 6) for example as mentioned below, to propagates in a direction to the viewer. Thereby, the light that propagates in a direction opposite to the viewer can be efficiently reflected into a direction to the viewer. As a result, the light emitted from the emission area 11-1 propagates in a direction to the viewer in its hundred percent.

Therefore, if one pixel is divided into the emission area 11-1 and the transmission area 11-2, an amount of light emitted from the entire one pixel does not change. Thereby, it is possible to display an image of quality equals to an image displayed on a screen on which the pixel is not divided into the emission area 11-1 and the transmission area 11-2. Incidentally, the transmission area 11-2 does not emit a light.

Then, owing to a plurality of emission areas 11-1, an image for a 3D display purpose is displayed on the front screen 11. Relating to this, the image actually displayed on the front screen 11 is in a state that parts of the image corresponding to a plurality of transmission areas 11-2 are not displayed. Nevertheless, one pixel is formed in a size as small as invisible or almost invisible to the viewer, and thereby the image can be viewed by the viewer in a quality almost equals to that of the image displayed on the conventional screen (i.e. on a display device not including the transmission area 11-2).

On the other hand, the light emitted from the rear screen 12 passes through the transmission area 11-2 to reach the viewer's eyes. In this case, a part of the light emitted from the rear screen 12 that propagates to the emission area 11-1 is reflected by the metal electrode (FIG. 5) or the reflector (FIG. 6) for example as mentioned below, and not reach the viewer's eyes. That is, the viewer recognizes only a part of the light that propagates to the transmission area 11-2.

As a comparative embodiment of the display apparatus of the present invention, a display apparatus whose front screen is not divided into the emission area 11-1 and the transmission area 11-2 will be discussed.

As shown in FIG. 3, a front screen 11a and a rear screen 12 emit a light from their overall surfaces, respectively. In this case, a part of the light emitted from the front screen 11a that propagates in a direction opposite to the viewer is reflected in a part or in its entirety on the surface of the rear screen 12. Thereby, the viewer recognizes this reflection light as an image displayed on the rear screen 12. That is, the viewer recognizes also the reflected image that is a reflection of the image displayed on the front screen 11a by the rear screen 12, as well as images displayed on the front screen 11a and the rear screen 12, respectively. This condition may cause a problem in a stereoscopic display technique for superimposing a plurality of images on the view line of the viewer, which may in turn cause difficulty or impossibility in displaying a right stereoscopic image.

Nevertheless, according to the display apparatus of this embodiment of the present invention, a part of the light, as seen in the comparative embodiment, that propagates from the front screen 11a to the rear screen 12 can be eliminated. Thereby, the reflection of the image displayed on the front screen 11 upon the rear screen 12 can be prevented, which is a great advantage. Therefore, images that are displayed on the front screen 11 and the rear screen 12 respectively can be suitably superimposed on the view line of the viewer. Thereby, the viewer can recognize only the images that are displayed on the front screen 11 and the rear screen 12 respectively, resulting in viewing the right stereoscopic image.

Furthermore, as shown in FIG. 4, a display apparatus 101, which is provided with a plurality of second emission areas 12-1 on a part of a rear screen 12a, can also provide the same effect as the display apparatus 100. Additionally, a satisfactory effect is obtained by making only a part of the rear screen 12a emit a light, resulting in reduction in the power consumption.

Incidentally, in this case, the emission area 12-1 of the rear screen 12a is preferably formed behind the transmission area 11-2 of the front screen. That is, the emission area 12-1 is preferably formed in such a manner that the light emitted from the emission area 12-1 of the rear screen 12a properly passes through the transmission area 11-2 of the front screen 11. Thereby, it is possible to prevent the light emitted from the emission area 12-1 from being reflected by the metal electrode (FIG. 5) or the reflector (FIG. 6) provided at the emission area 11-1 of the front screen 11 as mentioned below. Therefore, it is possible to prevent the reflected light from reaching the viewer's eyes as a noise light.

Embodiments of Display Device

Next, embodiments of the display device according to the present invention will be discussed, with reference to FIG. 5 to FIG. 11.

(1) Fundamental Structure of Display Device

Figure 5:
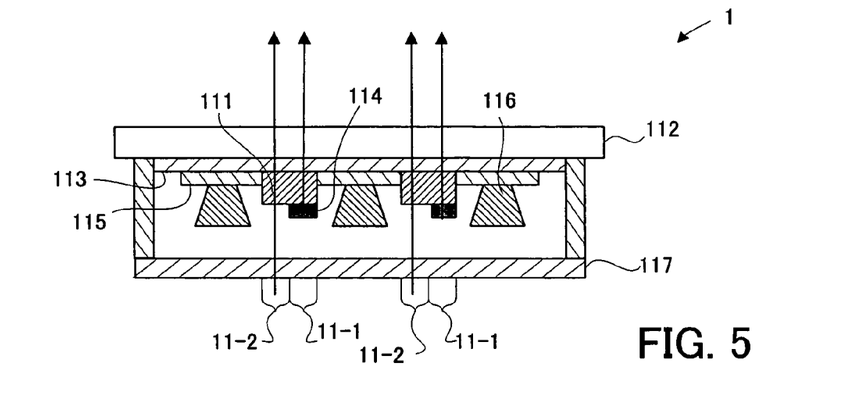
FIG. 5 is a cross-sectional view schematically illustrating a specific construction of an embodiment of a display device according to the present invention.
Figure 6:
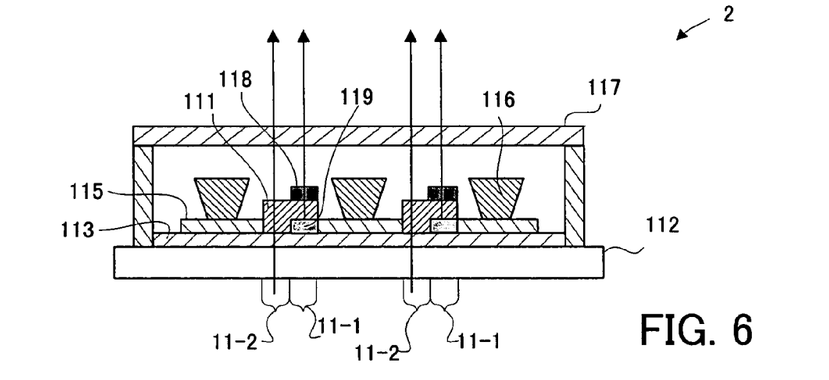
FIG. 6 is a cross-sectional view schematically illustrating another specific construction of the embodiment of the display device according to the present invention.
Figure 7:
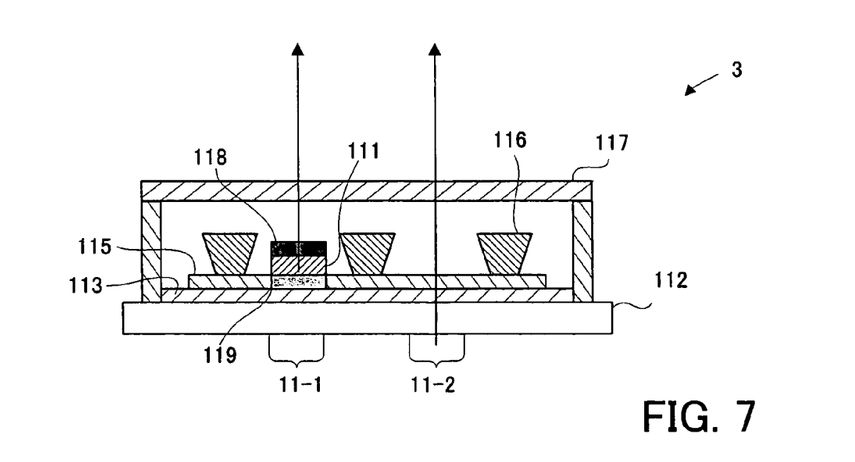
FIG. 7 is a cross-sectional view schematically illustrating another specific construction of the embodiment of the display device according to the present invention.

With reference to FIG. 5 to FIG. 7, a structure of an embodiment of the display device according to the present invention will be discussed. FIG. 5 is a cross-sectional view schematically illustrating a specific embodiment of the display device according to the present invention. FIG. 6 is a cross-sectional view schematically illustrating another specific embodiment of the display device according to the present invention. FIG. 7 is a cross-sectional view schematically illustrating another specific embodiment of the display device according to the present invention.

The display device 1 of this embodiment is structured as shown in FIG. 5. That is, the display device 1 is provided with an organic EL emission layer 111, a substrate, an ITO electrode (as anode) 113, a metal electrode 114 (as cathode), an insulation layer 115, a cathode diaphragm 116 and a transparent glass sealing lid 117. That is, the display device 1 is comprised of a bottom emission type of organic EL display device.

The organic EL emission layer 111 includes a hole injection layer (HIL), a hole transport layer (HTL), an emission layer (EML), an electron transport layer (ETL) and an electron injection layer (EIL), all of which are not shown in the figure. The HIL may be made of CuPc (Copper Phthalocyanin), the HTL may be made of alpha-NPB (N,N'-Di(naphthalen-1-yl)-N,N'-diphenyl-benzidine), the EML may be made of $Alq_3$ (Tris(8-hydroxy-quinoline) aluminum), the ETL may be made of BCP (Bathocuproine) and the EIL may be made of LiF (Lithium fluoride), respectively. Incidentally, the organic EL layer 111 may be disposed for each pixel of the display device 1, or may be disposed for a plurality of pixels.

Incidentally, each of the organic EL layers 111 is preferably disposed in a lattice-like pattern with the ITO electrode 113 and the metal electrode 114.

The substrate 112, which may be a glass substrate, is for supporting and protecting the organic EL layer 111. Alternatively, the substrate may be made of a polymer film. In the display device 1, the viewer recognizes an image generated by an emission from the organic EL emission layer 111, via the substrate 112.

The ITO electrode 113 is an exemplary "transparent electrode" in the present invention and an anode having a light transmissive property. Alternatively, an IZO electrode may be employed instead of the ITO electrode, as the anode.

The metal electrode 114, which is an exemplary "metal electrode layer" in the present invention, applies an electric voltage to the organic EL emission layer 111 that is formed between the metal electrode 114 and the ITO electrode 113. The organic EL emission layer 111 to which the electric voltage is applied emits a light. On the other hand, a part of the light that is emitted from the organic EL emission layer 111 and propagates in a direction opposite to the viewer (i.e. in a direction opposite to the substrate 112 in FIG. 5) is reflected toward the substrate 112. For this, the metal electrode 114 is preferably made of aluminum material having a high reflectivity. Nevertheless, the metal electrode 114 may be made of other material insofar as it has a light reflective property.

In particular, the metal electrode 114 is formed on a part of the surface of the organic EL emission layer 111 for applying an electric voltage to that part only. The remaining part of the surface of the organic EL emission layer 111 on which the metal electrode 114 is not formed does not emit a light and thereby transmits a light. That is, a part of the organic EL emission layer 111 corresponding to an area between the ITO 113 and the metal electrode 114 forms an emission area 11-1, while other part of the organic EL emission layer 111 corresponding to an area on which the metal electrode 114 is not formed forms a transmission area 11-2.

Incidentally, the organic EL emission layer 111 in an area on which the metal electrode 114 is not formed may be omitted. In this case, the organic EL emission layer between the metal electrode 114 and the ITO electrode 113 forms the emission area 11-1, while the other area where the organic EL emission layer 111 is not formed forms the transmission area 11-2.

The insulation layer 115, which may be made of polyimide for example, is for preventing a current leakage, and formed on a part of the substrate 112 on which the organic EL emission layer 111 is not formed.

The cathode diaphragm 116 is formed on a part of the insulation layer 115 on which the cathode is not formed, for patterning a cathode (i.e. metal electrode 114) into a suitable pattern during its manufacturing process.

The transparent glass sealing lid 117 is for protecting these aforementioned components from the ambient. Alternatively, in addition to or instead of the transparent glass sealing lid, a transparent sealing film may be employed.

In the arrangement as mentioned above, the display device 1 can display a desired image by means of the light emitted from the organic EL emission layer 111. Furthermore, an area on which the metal electrode 114 is not formed has a light transmissive property, and by which an image, picture, scenery or object behind the display device 1 can be recognized.

Additionally, dividing each organic EL emission layer 111 into the emission area 11-1 and the transmission area 11-2 allows the display device 1 to display a right image without deteriorating a resolution of the image.

On the other hand, as shown in FIG. 6, a top emission type of organic EL display device can also provide the same effect as the aforementioned display device 1.

In this case, as shown in FIG. 6, the display device 2 is provided with a transparent electrode 118 as an exemplary "transparent electrode layer" in the present invention, and a reflector 119 as an exemplary "reflection layer" in the present invention, instead of the metal electrode 114 shown in FIG. 5.

The transparent electrode 118 may be a cathode electrode, including ITO, having a light transmissive property. Alternatively, the transparent electrode 118 may be an electrode including IZO or a thin film metal electrode. The transparent electrode 118 is formed on a part of the surface of the organic EL emission layer 111 to form the emission area 11-1, similarly to the metal electrode 114 shown in FIG. 5.

The reflector 119 may be made of metal of high reflectivity such as aluminum. The reflector 119 is arranged so that a light emitted from the organic EL emission area 11-1 between the transparent electrode 118 and the ITO electrode 113 can propagate to the viewer. Therefore, similarly to the case of FIG. 1, a light emitted from the display device 2 propagates in a direction to the viewer (i.e. a direction opposite to the substrate 112 in FIG. 6) in its entirety.

Thus, also the top emission type of organic EL display device can provide the same effect as the display device 1 shown in FIG. 5.

Furthermore, a display device 3 as shown in FIG. 7 in which an entirety of each organic EL emission layer 111 is formed as an emission area 11-1 and a part on which the organic EL emission layer 111 is not formed is served as a transmission layer 11-2 can also provide the same effect as the display device according to the embodiment, instead of forming the emission area 11-1 and the transmission area 11-2 for each organic EL emission layer 111 as shown in FIG. 5 and FIG. 6.

As shown in FIG. 7, in the display device 3, the area where the organic EL emission layer 111 is formed forms the emission area 11-1, while the area where any of the organic EL emission layer 111 and the cathode diaphragm 116 is not formed forms the transmission area 11-2. In this case, the organic EL emission layer is preferably formed so that the emission area 11-1 and the transmission area 11-2 are next to each other. Nevertheless, the organic EL emission layer may be formed in other manners.

(2) Manufacturing Method of Display Device

Figure 8:
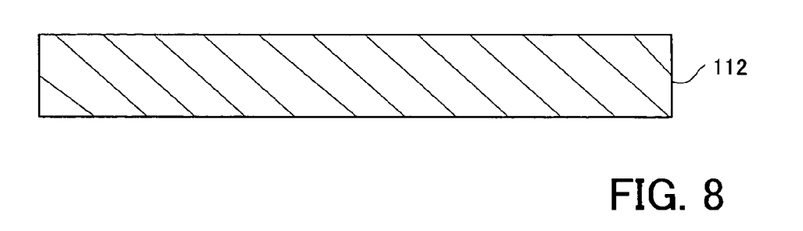
FIG. 8 is a cross-sectional view schematically illustrating a state in a manufacturing process of the embodiment of the display device according to the present invention.
Figure 9:
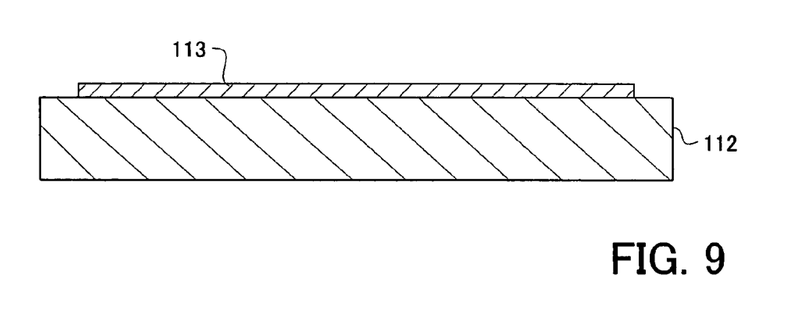
FIG. 9 is a cross-sectional view schematically illustrating another state in a manufacturing process of the embodiment of the display device according to the present invention.
Figure 10:
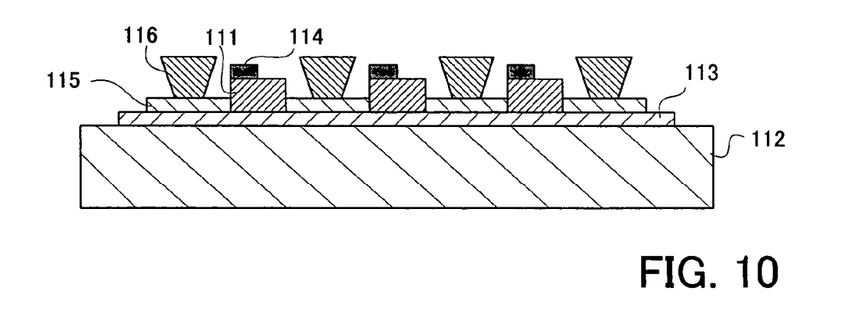
FIG. 10 is a cross-sectional view schematically illustrating another state in a manufacturing process of the embodiment of the display device according to the present invention.
Figure 11:
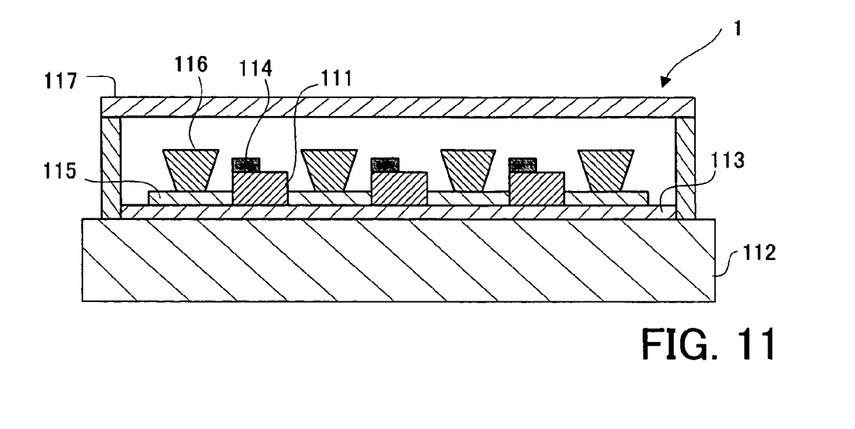
FIG. 11 is a cross-sectional view schematically illustrating another state in a manufacturing process of the embodiment of the display device according to the present invention.

Next, with reference to FIG. 8 to FIG. 11, embodiments of the display device according to the present invention, especially a manufacturing method of the display device 1, will be discussed. FIG. 8 is a cross-sectional view schematically illustrating a stage in a manufacturing process. FIG. 9 is a cross-sectional view schematically illustrating another stage in the manufacturing process. FIG. 10 is a cross-sectional view schematically illustrating another stage in the manufacturing process. FIG. 11 is a cross-sectional view schematically illustrating the display device after the manufacturing process is completed.

In order to fabricate the display device according to the embodiment of the present invention, firstly, a substrate 112 is prepared as shown in FIG. 8.

Next, as shown in FIG. 9, an ITO electrode 113 is formed on a surface of the substrate 112. Specifically, firstly, a patterning such as spattering is performed on a surface of the substrate 112 to deposit the ITO electrode 113.

Next, as shown in FIG. 10, an insulation layer 115, a cathode diaphragm 116, an organic EL emission layer 111 and a metal electrode 114 are formed on the ITO electrode that is deposited on the substrate 112. These components may be fabricated in a well-known manner in the art. For example, the insulation layer 115 is formed in a patterning method on an area other than a site where a pixel is formed. Then, the cathode diaphragm 116 is formed on the insulation layer 115. Then, the organic EL emission layer 111 is deposited in a vacuum evaporation method with a pattern mask. Then the metal electrode 114 is deposited on the organic EL emission layer 111 in a vacuum evaporation method. For this, a patterning of the metal electrode 114 is not performed in a cathode diaphragm method but with a mask, so that the metal electrode is formed on a part of the surface area of the organic EL emission layer 111. That is, the metal electrode 114 is formed only on the surface of the area corresponding to the emission area 11-1, and thereby another area of the organic EL emission layer 111 on which the metal electrode 114 is not formed forms the transmission area 11-2 having a light transmissive property.

Next, as shown in FIG. 11, a glass sealing lid 117 is formed so as to encapsulate the organic EL emission layer 111, the ITO electrode 113, the metal electrode 114, the insulation layer 115 and the cathode diaphragm 116, which are formed on a side of the substrate 112, in cooperation with the substrate 112.

After completion of these processes, the display device 1 shown in FIG. 11 is obtained.

Incidentally, the organic EL emission layer 111 is formed on both of the emission area 11-1 and the transmission area 11-2, but the organic EL emission layer 111 may be formed only on the surface corresponding to the emission area 11-1. That is, in this case, a patterned mask shaped in a predetermined pattern (i.e. a pattern for masking an area other then another area corresponding to the emission area 11-1) is prepared, and the organic EL emission layer 111 may be formed by means of the patterned mask. This alternative possesses has a great advantage, that is, reduction in an amount of material such as Alq3 to make the organic EL emission layer.

Incidentally, for the sake of convenience, the display device having one, two or three organic EL emission layers 111 are illustrated in FIG. 5 to FIG. 11, nevertheless, the any desired number of organic EL emission layers 111 may be formed depending on its application or use, in the real display device.

Specific Embodiments of Display Apparatus

Figure 12:
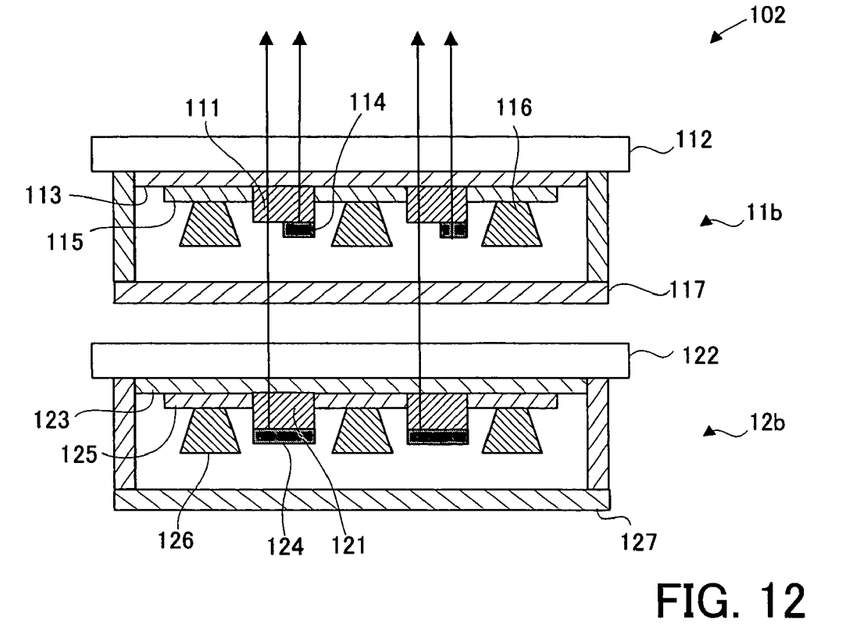
FIG. 12 is a cross-sectional view schematically illustrating a specific embodiment of the display apparatus employing an embodiment of an organic EL display device according to the present invention.
Figure 13:
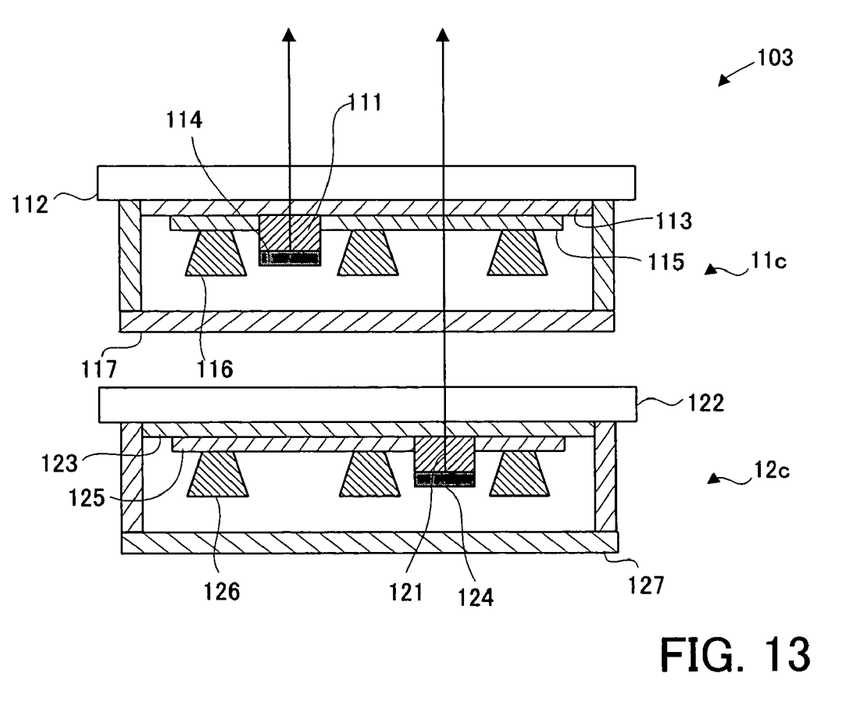
FIG. 13 is a cross-sectional view schematically illustrating another specific embodiment of the display apparatus employing an embodiment of an organic EL display device according to the present invention.
Figure 14:
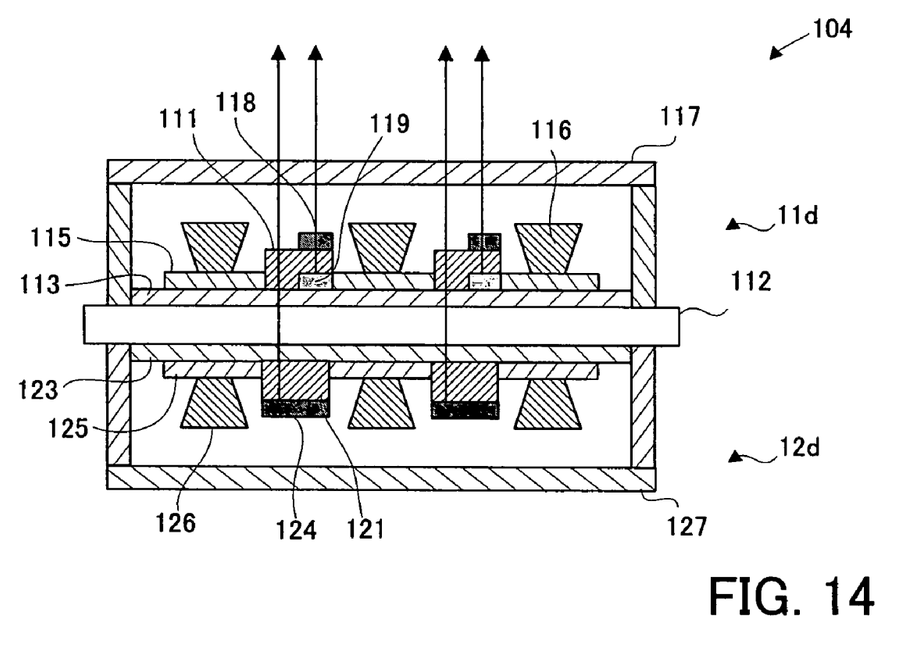
FIG. 14 is a cross-sectional view schematically illustrating another specific embodiment of the display apparatus employing an embodiment of an organic EL display device according to the present invention.
Figure 15:
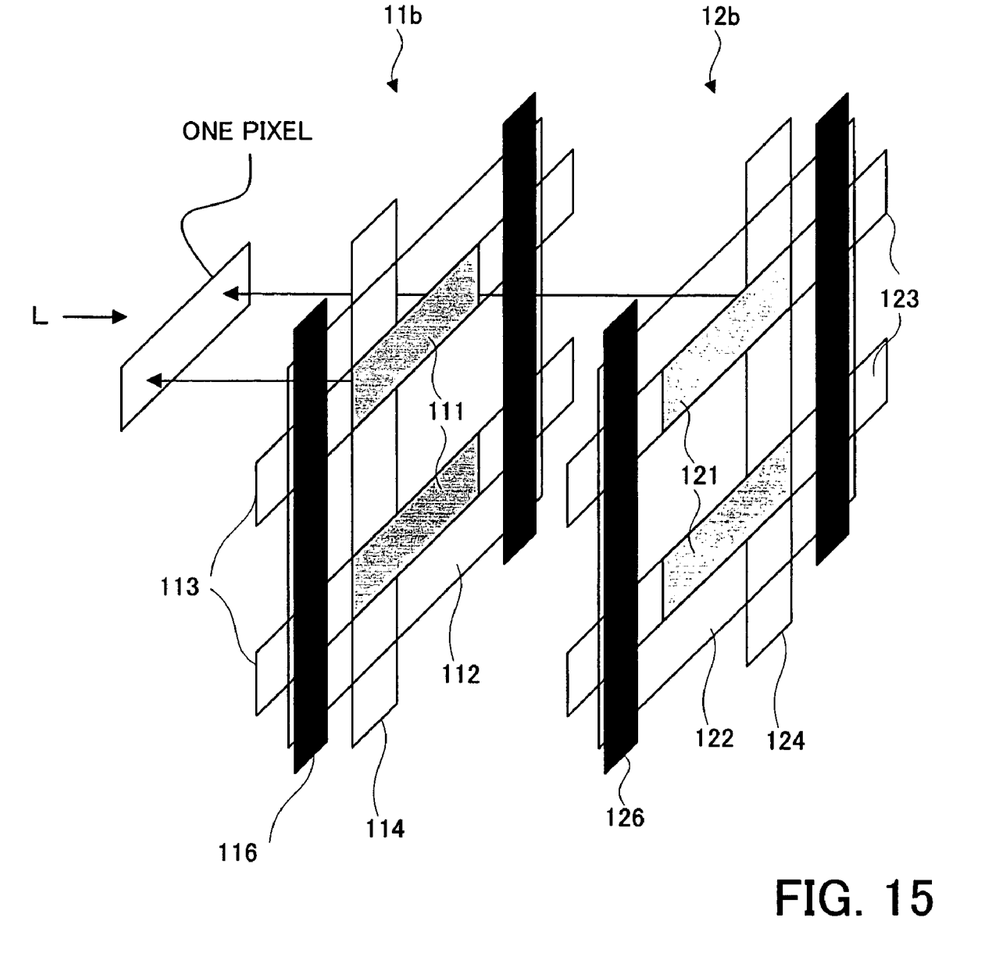
FIG. 15 is a perspective view schematically illustrating a specific embodiment of the display apparatus employing an embodiment of an organic EL display device according to the present invention.
Figure 16:
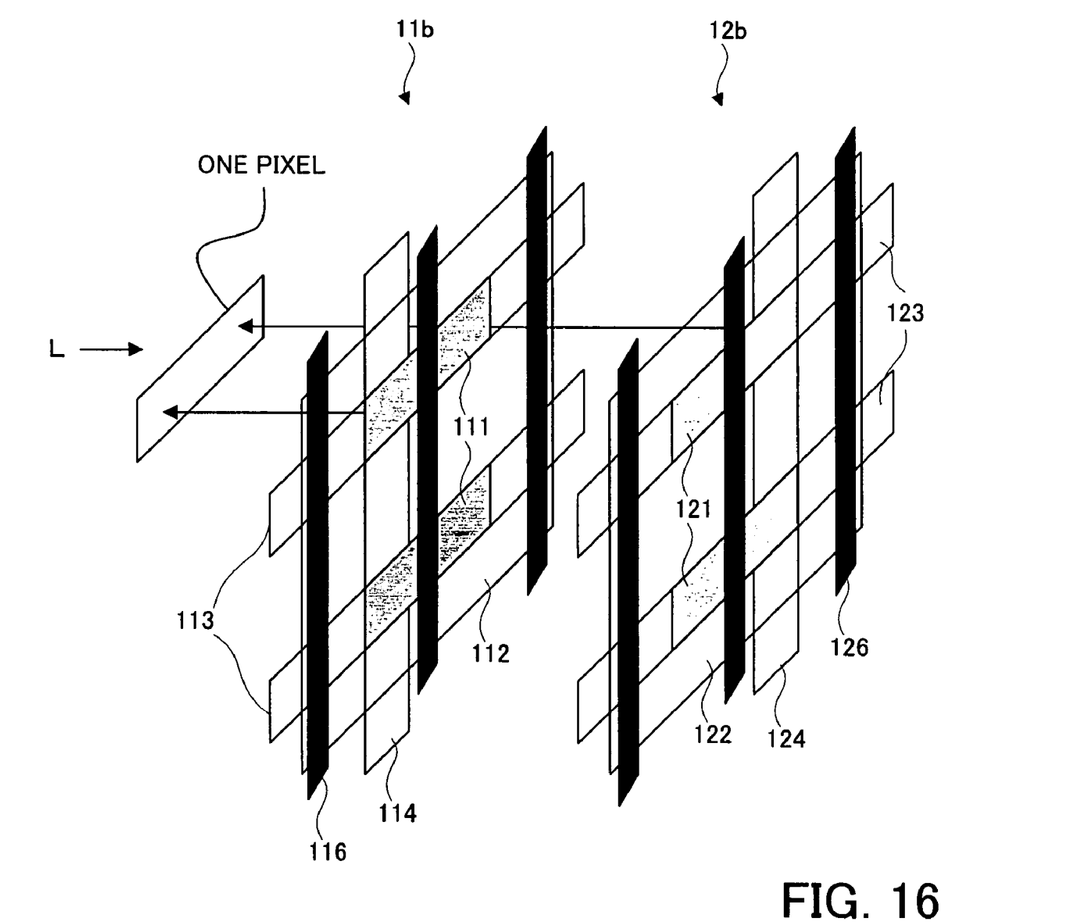
FIG. 16 is a perspective view schematically illustrating another specific embodiment of the display apparatus employing an embodiment of an organic EL display device according to the present invention.

Next, with reference to FIG. 12 to FIG. 16, more specific embodiments in embodiments of the display apparatus according to the present invention will be discussed. FIG. 12 is a cross-sectional view schematically illustrating a specific embodiment of the display apparatus according to the invention. FIG. 13 is a cross-sectional view schematically illustrating another specific embodiment of the display apparatus according to the invention. FIG. 14 is a cross-sectional view schematically illustrating another specific embodiment of the display apparatus according to the present invention. FIG. 15 is a perspective view schematically illustrating the embodiment of the FIG. 12. FIG. 16 is a perspective view schematically illustrating the embodiment of the FIG. 13. Incidentally, in FIG. 12 to FIG. 16, components the same as those of the display device in the above embodiments carry the same numerals, whose explanation is omitted.

The display apparatus 102 according to the present invention is constructed as shown in FIG. 12. That is, the front screen 11b is provided with the organic EL emission layer 111, the substrate 112, the ITO electrode (anode) 113, the metal electrode (cathode) 114, the insulation layer 115, the cathode diaphragm 116 and the transparent glass sealing lid 117, while the rear screen 12b is provided with the organic EL emission layer 121, the substrate 122, the ITO electrode (anode) 123, the metal electrode (cathode) 124, the insulation layer 125, the cathode diaphragm 126 and the transparent glass sealing lid 127. That is, a bottom emission type of organic EL display device is employed as the front screen 11b and the rear screen 12b. Particularly, the display device 1 as the exemplary display device of the invention is employed for the front screen 11b.

The organic EL emission layer 121 includes the HIL, the HTL, the EML, the ETL and the EIL, all of which are not shown in the figure. The HIL may be made of CuPc (Copper Phthalocyanin), the HTL may be made of alpha-NPB (N,N'-Di(naphthalen-1-yl)-N,N'-diphenyl-benzidine), the EML may be made of $Alq_3$ (Tris(8-hydroxy-quinoline) aluminum), the ETL may be made of BCP (Bathocuproine) and the EIL may be made of LiF (Lithium fluoride), respectively. Each of the organic EL layers 121 serves as a pixel of the rear screen 12b. Incidentally, each of the organic EL emission layers 121 is preferably formed in the same size as each of the organic EL emission layers 111, but this is not restrictive.

The substrate 122, which may be a glass substrate, is for protecting and supporting the organic EL emission layer 121. Alternatively, the substrate 122 may be made of polymer film.

The ITO electrode 123 is an anode having a light transmissive property. Alternatively, the ITO electrode may be replaced by an IZO electrode as the anode.

The metal electrode 124 may be made of aluminum. If an electric voltage is applied between the metal electrode 124 and the ITO electrode 123, the organic EL emission layer 121 emits a light in response to the applied electric voltage. Furthermore, a part of the light that is emitted from the organic EL emission layer 121 and propagates in a direction opposite to the viewer is reflected toward the substrate 122. For this, the metal electrode 124 is preferably made of aluminum having high reflectivity. Nevertheless, the metal electrode 124 may be made of any metal material insofar as it has a light reflective property.

Incidentally, the metal electrode 124 of the rear screen 12b may be formed on the entire surface of the organic EL emission layer 121, or may be formed on a part of the surface of the organic EL emission layer 121 so as to emit a light that passes through at least the transmission area 11-2 of the front screen 11b. In this case, the metal electrode 124 is preferably formed such that a part of the organic EL emission layer 121 capable of emitting a light is aligned with the transmission area 11-2 of the front screen lib. This possesses a great advantage of reducing a power consumption for emitting the organic EL emission layer 121. This possesses a further advantage of preventing the light emitted from the rear screen 12b from being reflected by the metal electrode 114 of the front screen 11 and being adversely recognized as a noise light by the viewer. In the case that the metal electrode 124 is formed on a part of the surface of the organic EL emission layer 121, it is not necessary to form the organic EL emission layer 121 in an area where the metal electrode is not formed.

The insulation layer 125, which may be made of polyimide film, is for preventing a current leakage, and formed at a position on the substrate other than a position where the organic EL emission layer 121 is formed.

The cathode diaphragm 126 is formed at a position where the cathode is not formed on the insulation layer 125 for patterning the cathode (i.e. the metal electrode 124) into a desired shape during fabrication of the cathode.

The transparent glass sealing lid 127 is for protecting the aforementioned components from the ambient. In addition to or instead of the transparent glass sealing lid, a transparent sealing film may be employed.

Incidentally, the rear screen 12b may be fabricated in a well-known process. Alternatively, in the case that the metal electrode 124 is formed on a part of the surface of the organic EL emission layer 121, the rear screen 12b may be fabricated in a method described with reference to FIG. 4 to FIG. 7.

In the aforementioned arrangement, it is possible to avoid the adversely effect in which the light emitted from the front screen 11b propagates to the rear screen 12b and forms a ghost image or a false image at a visible level to the viewer on the substrate 122. That is, images that are displayed on the front screen 11b and the rear screen 11b, respectively can be suitably superimposed on the view line of the viewer. Furthermore, since one organic EL emission layer 111 is divided into the emission area 11-1 and the transmission area 11-2, an image for a stereoscopic display purpose can be displayed on the front screen 11b, without reduction in the number of pixels, i.e. without degradation of resolution of the image. Therefore, the viewer can advantageously view a stereoscopic image by viewing images displayed on the front screen 11b and the rear screen 12b respectively that are suitably superimposed on the view line of the viewer.

Incidentally, the viewer recognizes, as one pixel, (i) the light emitted from the organic EL emission layer 111 of the front screen 11b and (ii) the light emitted from the organic EL emission layer 121 of the rear screen 12b corresponding to the organic EL emission layer 111, which are superimposed to each other on the view line.

Additionally, if the metal electrode 124 is formed on a part of the surface of the organic EL emission layer 121 such that a part of the organic EL emission layer 121 capable of emitting a light is aligned with the transmission area 11-2 of the front screen 11b, generation of a noise light can be reduced or avoided. Therefore, the viewer can view images displayed on the front screen 11b and the rear screen 12b respectively, which are suitably superimposed on the view line. Even if the metal electrode 124 is arranged in other manner, however, the viewer can view images displayed on the front screen 11b and the rear screen 12b respectively, which are suitably superimposed on the view line.

Alternatively, in the case that a top emission type of organic EL display device (i.e. the display device 2 as one specific embodiment of the display device according to the present invention) is employed as the front screen 11 and/or the rear screen 12, instead of employing a bottom emission type of organic EL display device as both the front screen 11 and the rear screen 12, the same effect as the display apparatus according to the embodiment as mentioned above can be obtained.

Furthermore, in the case of a display apparatus 103 in which one organic EL emission layer 111 serves the emission area 11-1 and a part of the substrate where the organic EL emission layer 111 is not formed serves the transmission area 11-2 as shown in FIG. 13, instead of forming the emission area 11-1 and the transmission area 11-2 for each organic EL emission layer 111, the same effect as the display apparatus according to this embodiment can be also obtained.

As shown in FIG. 13, in the front screen 11c, an area where the organic EL emission layer 111 is formed serves as the emission area 11-1, while an area where neither the organic EL emission layer 111 nor the cathode diaphragm 116 is not formed serves as the transmission area 11-2. In this case, the organic EL emission layer 111 is preferably formed so that the emission area 11-1 and the transmission area 11-2 are next to each other.

On the other hand, in the rear screen 12c, the organic EL emission layer 121 is formed so as to emit a light capable of transmitting through the transmission area 11-2 of the front screen 11c. In this case, one pixel is formed by a combination of the organic EL emission layer 111 of the front screen 11c and the organic EL emission layer 121 of the rear screen 12c that emits a light to be recognized by the viewer in a state that it is superimposed with another light emitted from the organic EL emission layer 111 on the view line of the viewer. Incidentally, an organic EL emission layer 121 for emitting a light that propagates to a direction to the emission area 11-1 of the front screen 11c may be further formed in the rear screen 12c.

Also in the aforementioned arrangement, the same effect as the display apparatus 102 shown in FIG. 12 can be obtained. That is, it is possible to avoid the adversely effect in which the light emitted from the front screen 11c propagates to the rear screen 12c and forms a ghost image or a false image at a visible level to the viewer on the substrate 122.

Furthermore, also in a display apparatus 104 employing an organic EL display device in which a front screen lid is formed on a surface of the substrate and a rear screen 12d is formed on another surface of the substrate, as shown in FIG. 14, the same effect as the display apparatus according to this embodiment can be obtained.

Also in this arrangement, similarly to the display apparatuses 102 and 103 according to the above FIG. 12 and FIG. 13, it is possible to avoid the adversely effect in which the light emitted from the front screen lid propagates to the rear screen 12d and forms a ghost image of a false image at a visible level to the viewer on the substrate 122.

Next, with reference to FIG. 15, the perspective view of the front screen 11b and the rear screen 12b, which are depicted as a sectional view in FIG. 12, a display apparatus 102 in which an emission area 11-1 and a transmission area 11-2 are formed for each organic EL emission layer 111 will now be discussed. Incidentally, in FIG. 15, only a part of components depicted in FIG. 12 is extracted for the explanation purpose.

In this case, the emission area 11-1 is obtained by applying electric voltage only to a part of the organic EL emission layer 111 (121) at which the metal electrode 114 (124) and the ITO electrode 113 (123) cross to each other. Incidentally, as mentioned above, the organic EL emission layer 111 (121) may be formed only at a part at which the metal electrode 114 (124) and the ITO electrode 113 (123) cross to each other. Incidentally, in the case of FIG. 15, the metal electrode 124 is formed on a part of the surface of the organic EL emission layer 121 so as to emit a light that passes through the transmission area 11-2.

Next, with reference to FIG. 16, the perspective view of the front screen 11c and the rear screen 12c, which are depicted as a sectional view in FIG. 13, a display apparatus 103 in which one organic EL emission layer 111 serves as an emission area 11-1 will now be discussed. Incidentally, in FIG. 16, only a part of components depicted in FIG. 13 is extracted for the explanation purpose.

In this case, only one pixel on which the metal electrode 114 (124) is formed emits a light, while an area where the metal electrode 114 (124) is not formed does not emit a light and thereby serves as the transmission area 11-2. Relating to this, it is not necessary to form the organic EL emission layer 111 in the area that serves as the transmission area 11-2. That is, the area that serves as the transmission area 11-2 is required to transmit a light emitted from the rear screen 12c. Incidentally, in the case of FIG. 16, the metal electrode 124 is formed in a predetermined area so as to emit a light that passes through the transmission area 11-2. It is not necessary to form the organic EL emission layer 124 in an area where the metal electrode 124 is not formed.

Incidentally, in this embodiment, although the display apparatus having two screens (i.e. the front screen 11 and the rear screen 12) is discussed, a display apparatus having three or more screens can give the same effect. In this case, the emission area and the transmission area of each screen are preferably disposed so as to make an alignment in accordance with the aforementioned embodiments. That is, they are preferably arranged so that a light emitted from an emission area of one screen transmits a transmission area of another screen disposed ahead of the former screen (rear screen), while a transmission area of one screen is preferably arranged so as to transmit a light emitted from an emission area of another screen disposed behind the former screen (front screen).

The invention may be embodied in other specific forms without departing from the spirit or essential characteristics thereof The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-016673 filed on Jan. 24, 2003 including the specification, claims, drawings and summary is incorporated herein by reference in its entirety.

What is claimed is:

1. A display apparatus for displaying a stereoscopic image by superimposing a plurality of images on a view line of a viewer, said plurality of images being spaced from each other by a predetermined distance, said display apparatus comprising:
   (i) a first display unit including a display device having a plurality of first emission areas for emitting a light, disposed in a discrete manner in a plane of a display screen and a plurality of transmission areas for transmitting a light, disposed in a discrete manner in the plane of the display screen except for areas occupied by said plurality of first emission areas; and
   (ii) a second display unit disposed behind the first display unit as seen from the viewer, including another display device having a plurality of second emission areas for emitting a light, disposed in a discrete manner at least partially in a plane of a display screen, wherein
   each of said plurality of first emission areas has a first electroluminescence emission layer,
   each of said plurality of transmission areas does not have the first electroluminescence emission layer,
   each of said plurality of second emission areas has a second electroluminescence layer, so as to emit the light which passes through each of said plurality of transmission areas.

2. The display apparatus according to claim 1, wherein each of said plurality of second emission areas is disposed for each pixel of the another display device or for a plurality of pixels of the another display device in the plane.

3. The display apparatus according to claim 1, wherein each of said plurality of second emission areas is disposed so as to align with each of said plurality of transmission areas.

4. The display apparatus according to claim 1, wherein each of said plurality of second emission areas is of a size the same as that of each of said plurality of transmission areas.

5. The display apparatus according to claim 1, wherein said second display unit is an electroluminescence display device.

6. The display apparatus according to claim 1, wherein each of said plurality of first emission areas is disposed for each pixel of the display device or for a plurality of pixels of the display device in the plane.

7. The display apparatus according to claim 1, wherein at least one of said plurality of first emission areas and at least one of said plurality of transmission areas is disposed in a same pixel of the display device.

8. The display apparatus according to claim 1, wherein each of said plurality of first emission areas has a reflection layer disposed behind the first electroluminescence emission layer as seen from the said display screen, and
   said plurality of transmission areas has light transmissive areas that are positioned in interstitial areas where said reflection layer is not formed.

9. The display apparatus according to claim 8, wherein said reflection layer is a metal electrode layer acting as one of a pair of electrodes for applying a drive voltage to said first electroluminescence emission layer from the side of said first electroluminescence emission layer opposite said display screen.

10. The display apparatus according to claim 9, wherein the other of said pair of electrodes is a transparent electrode layer disposed toward the front of said first electroluminescence emission layer as seen from the display screen.

* * * * *